US012111824B2

United States Patent
Vijayan et al.

(10) Patent No.: US 12,111,824 B2
(45) Date of Patent: Oct. 8, 2024

(54) MULTI BOT ARCHITECTURE FOR AUTOMATED DATA PROCESSING

(71) Applicant: Synchrony Bank, Stamford, CT (US)

(72) Inventors: Vanitha Vijayan, Stamford, CT (US); Kristen Scatola, Stamford, CT (US); Edward Zhang, Stamford, CT (US)

(73) Assignee: Synchrony Bank, Stamford, CT (US)

( * ) Notice: Subject to any disclaimer, the term of this patent is extended or adjusted under 35 U.S.C. 154(b) by 0 days.

(21) Appl. No.: 17/467,704

(22) Filed: Sep. 7, 2021

(65) Prior Publication Data

US 2022/0092058 A1 Mar. 24, 2022

Related U.S. Application Data

(60) Provisional application No. 63/080,477, filed on Sep. 18, 2020.

(51) Int. Cl.
*G06F 16/23* (2019.01)
*G06F 9/46* (2006.01)
*G06F 9/54* (2006.01)
*H04L 67/62* (2022.01)

(52) U.S. Cl.
CPC ......... *G06F 16/2386* (2019.01); *G06F 9/466* (2013.01); *G06F 9/54* (2013.01); *H04L 67/62* (2022.05)

(58) Field of Classification Search
None
See application file for complete search history.

(56) References Cited

U.S. PATENT DOCUMENTS

| | | | | |
|---|---|---|---|---|
| 9,152,921 | B2* | 10/2015 | Chu | G06F 9/5066 |
| 10,705,948 | B2* | 7/2020 | Ramasamy | G06F 11/3688 |
| 10,908,950 | B1* | 2/2021 | Dennis | G06F 9/4881 |
| 2019/0347146 | A1* | 11/2019 | Hu | G06F 9/546 |
| 2019/0377605 | A1* | 12/2019 | Joseph | G06F 9/5011 |
| 2021/0173718 | A1* | 6/2021 | Patel | G06F 40/295 |

* cited by examiner

*Primary Examiner* — Chat C Do
*Assistant Examiner* — William C Wood
(74) *Attorney, Agent, or Firm* — Polsinelli LLP

(57) ABSTRACT

The present disclosure is directed to a system of software robots executed on a plurality of network clients for a secure and automated processing of time sensitive data. In one aspect, a method includes receiving a data set for processing, processing the data set being subject to a time limit; splitting the data set into a plurality of data subsets; assigning each of the plurality of data subsets to one a plurality of network clients each of which is configured to execute at least one software bot to process one or more data subsets of the plurality of data subsets assigned thereto; configuring the plurality of network clients to simultaneously process the one or more data subsets assigned thereto such that the data set is processed within the time limit; configuring each of the plurality of network clients to provide an update on processing status of each of the one or more data subsets assigned thereto; and generating a summary report indicative of a summary of the data set processed.

15 Claims, 10 Drawing Sheets

| |
|---|
| SHA-RPA-VDI-AA0024-P |
| SHA-RPA-VDI-AA0025-P |
| SHA-RPA-VDI-AA0026-P |
| SHA-RPA-VDI-AA0027-P |
| SHA-RPA-VDI-AA0028-P |
| SHA-RPA-VDI-AA0029-P |
| SHA-RPA-VDI-AA0030-P |
| SHA-RPA-VDI-AA0031-P |
| SHA-RPA-VDI-AA0032-P |
| SHA-RPA-VDI-AA0033-P |
| SHA-RPA-VDI-AA0034-P |
| SHA-RPA-VDI-AA0035-P |
| SHA-RPA-VDI-AA0036-P |
| SHA-RPA-VDI-AA0037-P |
| SHA-RPA-VDI-AA0038-P |
| SHA-RPA-VDI-AA0039-P |
| SHA-RPA-VDI-AA0040-P |
| SHA-RPA-VDI-AA0041-P |
| SHA-RPA-VDI-AA0042-P |
| SHA-RPA-VDI-AA0043-P |

MULTI BOT ARCHITECTURE FOR AUTOMATED DATA PROCESSING

CROSS-REFERENCE TO RELATED APPLICATIONS

The present application claims priority to U.S. Provisional Application 63/080,477 filed Sep. 18, 2020, which is incorporated herein by reference in its entirety.

BACKGROUND

Field of the Disclosure

The present disclosure relates to a system for a secure and automated processing of time sensitive data. More specifically, the present disclosure is directed to a system of software robots executed on a plurality of network clients for a secure and automated processing of time sensitive data.

Description of the Related Art

Data processing is critical to the success of many businesses. Through such processing, business can gain valuable insights into their business operations, customers' trends, view and needs, all leading to better and more targeted business approaches and outcomes. However, validity of such processed data may be limited in time. In other words, the results of a set of data processed at time A may no longer be valid at time B. One example of such scenario is the processing of customers' financial and spending data. Financial institutions may periodically process such data with the objective of determining whether to increase/decrease any given customer's available credit. However, such financial and spending data may continuously change and data processed at time A may no longer be a valid indication of a customer's financial and spending data at time B.

Many existing approaches are fully or partly manual, which undermines the time criticality of such data processing. What is needed, is a fully automated data processing architecture for processing hundreds of thousands of data subject to a time limit.

SUMMARY

To address the deficiencies in the existing systems for data processing, as described above, the present disclosure provides systems, methods and computer-readable media for a fully automated multi robot (bot) architecture that can analyze and process a large set of data subject to a time limit. As will be described, the architecture creates multiple bots (software robots) and executes them using multiple network clients (bot runners) that can take segments of a large data set (batches) and continuously process such batches. Such architecture also benefits from the capability of parallel and simultaneous processing of batches by multiple bot runners, which in turn enables the processing of massive/large sets of data within a required time limit.

In one aspect, a method includes receiving a data set for processing, processing the data set being subject to a time limit; splitting the data set into a plurality of data subsets; assigning each of the plurality of data subsets to one a plurality of network clients each of which is configured to execute at least one software bot to process one or more data subsets of the plurality of data subsets assigned thereto; configuring the plurality of network clients to simultaneously process the one or more data subsets assigned thereto such that the data set is processed within the time limit; configuring each of the plurality of network clients to provide an update on processing status of each of the one or more data subsets assigned thereto; and generating a summary report indicative of a summary of the data set processed.

In another aspect, the splitting is based on a size of the data set and a maximum size of each data subset.

In another aspect, the method further includes determining a number of the plurality of network clients for processing the plurality of data subsets.

In another aspect, the number of the plurality of network clients is determined based on a size of the data set, the time limit and an average processing time for each one of available network clients.

In another aspect, the method further includes generating a folder for each of the plurality of network clients, each folder including one or more of the data subsets assigned thereto.

In another aspect, the assigning is performed by executing the at least one software bot on one of the plurality of network clients.

In another aspect, the update is a notification from one of the plurality of network clients indicative of a processing error for one of the one or more data subsets assigned thereto.

In another aspect, the method further includes performing a correction process to fix the processing error.

In another aspect, the correction process includes at least one updating code of a corresponding software bot, relaunching the corresponding software bot, and redistribution of a data set to another one of the plurality network clients.

In one aspect, a controller includes one or more memories configured to store computer-readable instructions and one or more processors. The one or more processors configured to execute the computer-readable instructions to receive a data set for processing, processing the data set being subject to a time limit; split the data set into a plurality of data subsets; assign each of the plurality of data subsets to one a plurality of network clients each of which is configured to execute at least one software bot to process one or more data subsets of the plurality of data subsets assigned thereto; configure the plurality of network clients to simultaneously process the one or more data subsets assigned thereto such that the data set is processed within the time limit; configure each of the plurality of network clients to provide an update on processing status of each of the one or more data subsets assigned thereto; and generate a summary report indicative of a summary of the data set processed.

In one aspect, one or more non-transitory computer-readable media includes computer-readable instructions, which when executed by one or more processors of a controller, cause the controller to receive a data set for processing, processing the data set being subject to a time limit; split the data set into a plurality of data subsets; assign each of the plurality of data subsets to one a plurality of network clients each of which is configured to execute at least one software bot to process one or more data subsets of the plurality of data subsets assigned thereto; configure the plurality of network clients to simultaneously process the one or more data subsets assigned thereto such that the data set is processed within the time limit; configure each of the plurality of network clients to provide an update on processing status of each of the one or more data subsets assigned thereto; and generate a summary report indicative of a summary of the data set processed.

BRIEF DESCRIPTION OF THE DRAWINGS

The accompanying drawings illustrate various embodiments of systems, methods, and embodiments of various other aspects of the disclosure. Any person with ordinary skills in the art will appreciate that the illustrated element boundaries (e.g. boxes, groups of boxes, or other shapes) in the figures represent one example of the boundaries. It may be that in some examples one element may be designed as multiple elements or that multiple elements may be designed as one element. In some examples, an element shown as an internal component of one element may be implemented as an external component in another, and vice versa. Furthermore, elements may not be drawn to scale. Non-limiting and non-exhaustive descriptions are described with reference to the following drawings. The components in the figures are not necessarily to scale, emphasis instead being placed upon illustrating principles.

FIG. 3 is an example list of bot runners, according to one aspect of the present disclosure;

FIG. 5 illustrates example folders created through execution of distribution bot of FIG. 2, according to one aspect of the present disclosure;

FIG. 6 illustrates files of one folder of FIG. 5, according to one aspect of the present disclosure;

DETAILED DESCRIPTION

Specific details are provided in the following description to provide a thorough understanding of embodiments. However, it will be understood by one of ordinary skill in the art that embodiments may be practiced without these specific details. For example, systems may be shown in block diagrams so as not to obscure the embodiments in unnecessary detail. In other instances, well-known processes, structures and techniques may be shown without unnecessary detail in order to avoid obscuring embodiments.

Although a flow chart may describe the operations as a sequential process, many of the operations may be performed in parallel, concurrently or simultaneously. In addition, the order of the operations may be re-arranged. A process may be terminated when its operations are completed, but may also have additional steps not included in the figure. A process may correspond to a method, function, procedure, subroutine, subprogram, etc. When a process corresponds to a function, its termination may correspond to a return of the function to the calling function or the main function.

Example embodiments of the present disclosure will be described more fully hereinafter with reference to the accompanying drawings in which like numerals represent like elements throughout the several figures, and in which example embodiments are shown. Example embodiments of the claims may, however, be embodied in many different forms and should not be construed as limited to the example embodiments set forth herein. The examples set forth herein are non-limiting examples and are merely examples among other possible examples.

As noted above, to address the deficiencies in the existing systems for data processing, the present disclosure provides systems, methods and computer-readable media for a fully automated multi robot (bot) architecture that can analyze and process a large set of data subject to a time limit. As will be described, the architecture creates and deploys multiple bots (software robots) using multiple devices/bot runners that can take segments of a large data set (which may be referred to as data subsets or batches) and continuously process such batches. Such architecture also benefits from the capability of parallel and simultaneous processing of batches by multiple bot runners, which in turn enables the processing of massive/large sets of data within a required time limit.

The disclosure begins with a description of an example architecture to be used for data processing according to the present disclosure.

Figure 1:
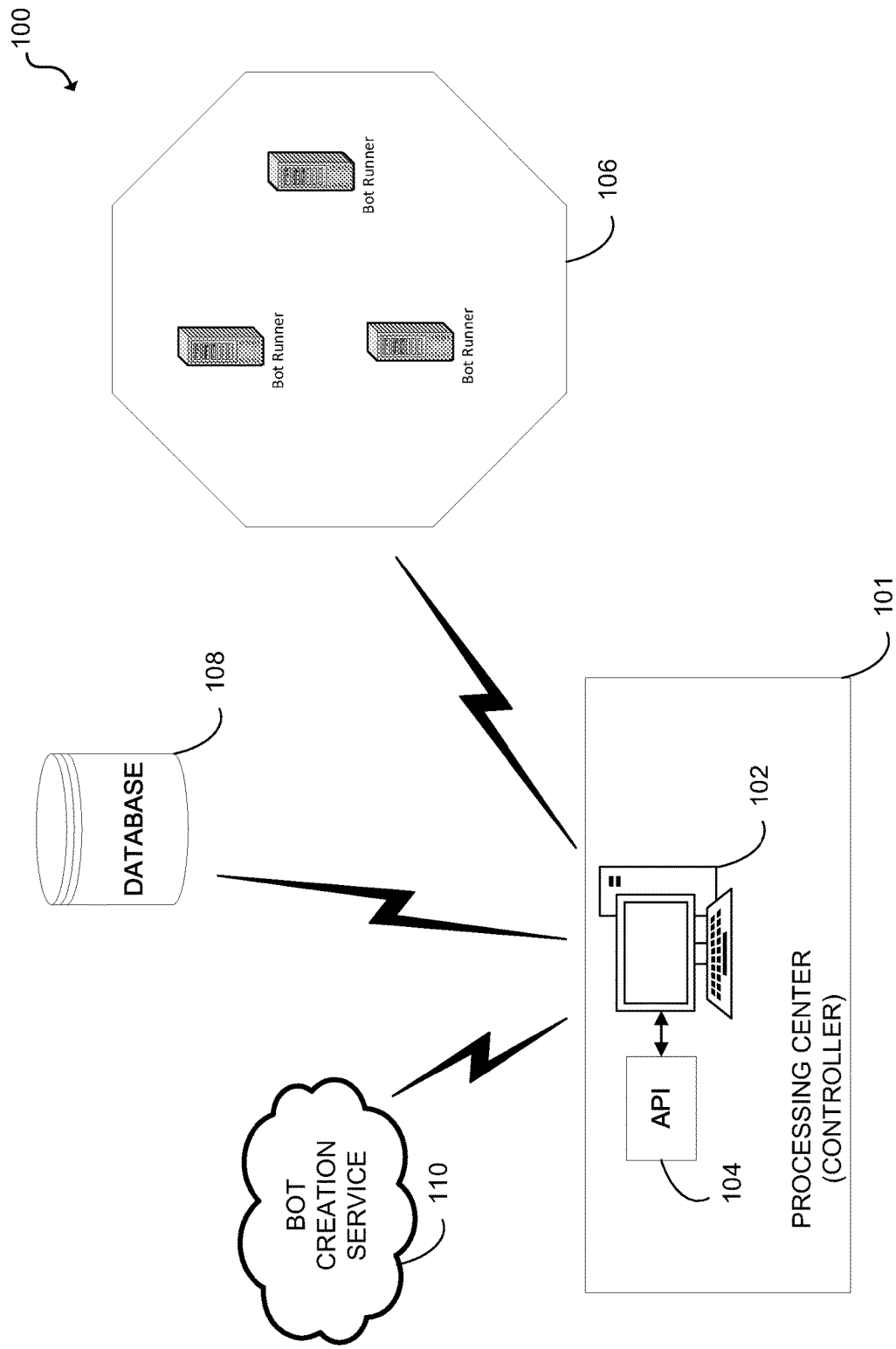
FIG. 1 illustrates a multi-bot architecture for data processing, according to an aspect of the present disclosure.

FIG. 1 illustrates a multi-bot architecture for data processing, according to an aspect of the present disclosure. Architecture 100 includes processing center 101 (controller 101) for controlling/monitoring data processing operation performed by architecture 100. Controller 101 may manage (control) one or more terminals 102 (which may also be referred to as network client or simply client 102) via which an Application Programming Interface (API) 104 may be accessed for defining bot runners, creating bots, monitoring operation of multi-bot architecture before, during and after data processing, etc. In another example, each terminal 102 may be associated with a different/dedicated API 104. Terminals 102 of controller 101 may be controlled/managed via a Virtual Desktop Infrastructure (VDI) 105. VDI 105 can also be a physical machine or terminal such as a desktop, a laptop, a mobile phone, a tablet, etc.

Using API 104, a network operator/user may access any one of network clients 102 from VDI 105 to create, bots, execute bot runners, etc. A bot may be defined as a software program configured to perform automated tasks (scripts). Accordingly, a bot may also be referred to as a software bot, an internet bot, a web robot or simply a robot. A bot may be created using any known or to be developed technique. A bot may be generated and programmed to perform a series of tasks. An example task would be processing financial data of a given customer to identify information such as spending trend, payment trend, a credit/debt ratio, credit/spending ratio, etc.

API 104 may be used to create multiple bots, which may be run/executed on multiple machines, servers, virtual machines within device pool 106, as will be further described below.

Architecture 100 also includes a device pool 106. Device pool 106 may include a number of servers and machines hosting computer-readable codes referred to as bot runners (or alternatively network clients) such as bot runners 106-1, 106-2 and 106-3 for running bots. Number of bot runners in device pool 106 is not limited to three bot runners 106-1, 106-2 and 106-3 and may be more or less. Controller 101 may have stored thereon, a list of available bot runners in device pool 106 that may be tapped/used for data processing. Such list may be periodically updated to add or remove bot runners and their identification.

Bot runners 106-1, 106-2 and/or 106-3 may not necessarily be hosted on separate physical machines. Each or any two or more of bot runners 106-1, 106-2 and/or 106-3 may be hosted on the same virtual machine and/or the same physical device (e.g., a server).

In one example, bots may be created using API 104 and assigned to a number (one or more) of available bot runners in device pool 106. Through API 104, one or more bot runner decisioning parameters may be provided such as a size of a data set to be processed, a size of each data subset to be assigned to any given bot runner for processing, a time limit for processing the entire data set, etc. As will be described below, one or more bots may be defined that can perform tasks related to management of operations of all remaining bots. For example, a distribution bot may be defined for distribution of subsets or batches of a given data set to different bot runners for processing. Another bot may be defined as consume bot, which may run on all bot runners after all batches are assigned to defined bot runners and may operate to ensure processing of batches and/or to identify/address issues and failures that may occur through the data processing operations. Details of operations of distribution and consume bots will be further described below.

Architecture 100 also includes a database 108, on which input data (data set) to be processed, may be stored. Database 108 may be a single data storage unit or may comprise multiple/distributed storage units.

Architecture 100 may further include a bot creation service 110, which may be a cloud based service. Bot creation service 110 may be hosted on a machine accessible via cloud. Bot creation service 110 may be private to and owned by an organization associated with and running/operation architecture 100 or may be a publicly available cloud service that provides bot creation services to customers such as the organization/entity/user associated with and running organization Components of architecture 100 may be communicatively coupled to one another using any known or to be developed wired and/or wireless communication means.

Operation of architecture 100 may be triggered by a user using VDI 105 and API 104 to specify a data set to be processed, tasks to be performed by each bot (to be generated), a number of available bot runners, a size of each data subset of the data set (batch), a time limit for processing the data, and a number of data subsets (batches) to be processed by each bot. With such parameters/tasks specified, architecture 100 may automatically retrieve the data set, identify batches, use appropriate number of bots and perform data processing, as will be described below.

A process for using a multi-bot runner for data processing is first described with reference to FIG. 2 followed by several examples of the process described with reference to FIGS. 3-9.

Figure 2:
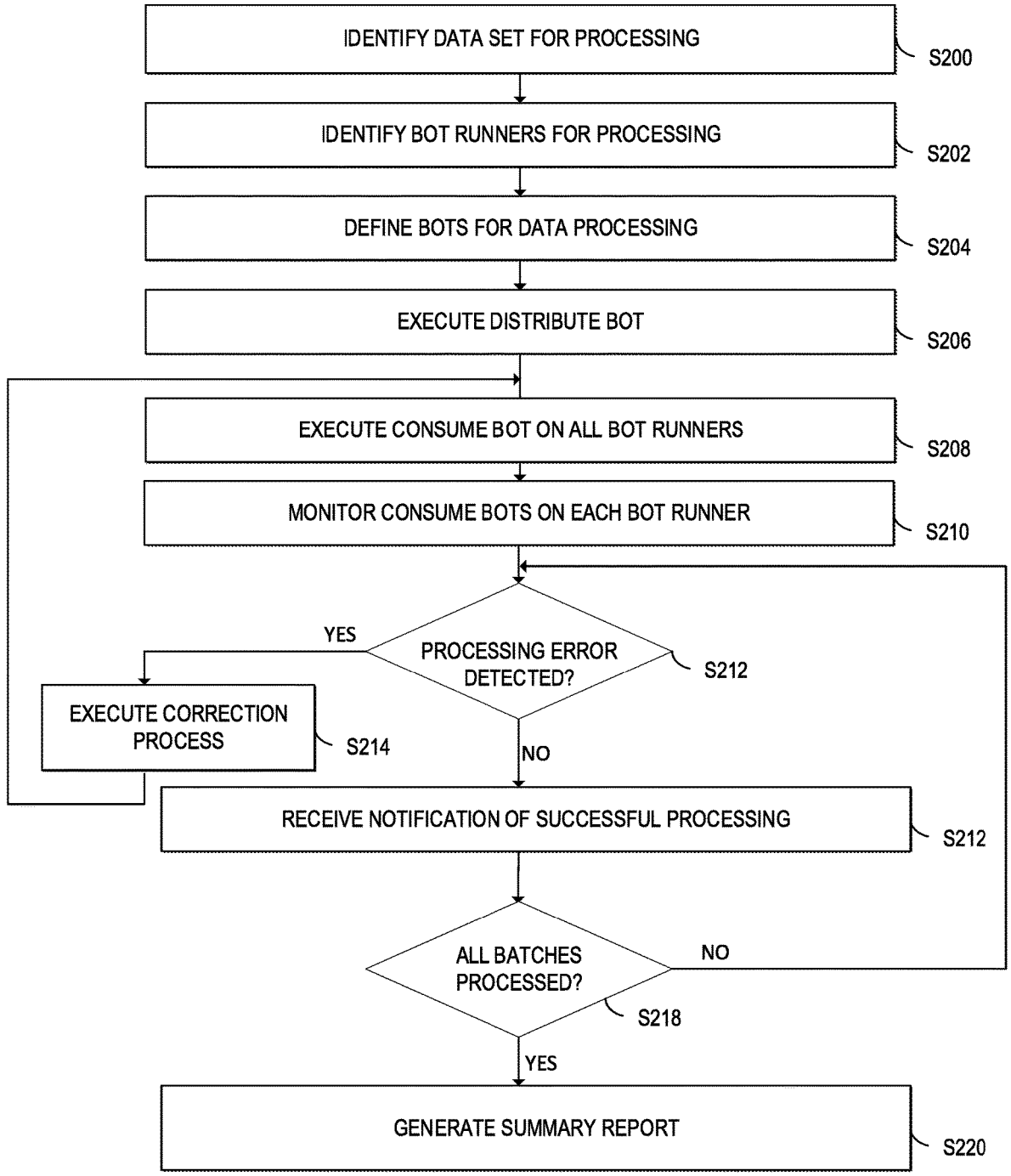
FIG. 2 describes a data processing flow using a multi bot architecture of FIG. 1, according to an aspect of the present disclosure.

FIG. 2 describes a data processing flow using a multi bot architecture of FIG. 1, according to an aspect of the present disclosure. FIG. 2 will be described with reference to FIG. 1. Furthermore, FIG. 2 will be described from the perspective of controller 101. However, it will be understood that controller 101 has one or more client 102 with corresponding processor(s) configured to execute computer-readable instructions stored on one or more memories in order to perform steps of FIG. 2 described below.

At S200, controller 101 identifies a data set to be processed. This data set may be accessed via API 104. For example, through API 104, an operator at terminal 102 may identify location of data set (e.g., database 108).

In another example, such data processing may occur periodically and automatically (e.g., daily, weekly, monthly, quarterly, semi-annually, annually, etc.). Accordingly, controller 101 may be programmed such that controller 101 periodically accesses database 108 to determine whether there is a data set to be processed and if so, retrieves such database for processing.

At S202, controller 101 identifies available bot runners for running bots to process data. Available bot runners may be selected from device pool 106. In one example, available bot runners may be identified through inputs received at terminal 102. For example, a spreadsheet with a list of available bot runners may be provided as input (examples of such spreadsheet will be described further below).

In another example and as mentioned above, a list of available bot runners may be kept at controller 101 (e.g., stored in a database accessible to controller 101), which is continuously/periodically updated to identify bot runners available for data processing. In this instance, controller 101 may access such database and select a number of such bot runners for data processing. There may be a number of factors considered for determining the exact number of bot runners.

In one example, all available bot runners are automatically selected for data processing. In another example, a predetermined number of bot runners are automatically selected. For example, controller 101 may be pre-programmed to automatically select at least 20 bot runners every time there is a data set to be processed. In another example, controller 101 may be programmed to select a fixed number of bot runners depending on a size of the data set. For example, a data set with more than 250,000 records to process, may need at least 10 bot runners for the data set to be processed within a time limit of 10 hours, may need at least 20 bot runners for the data set to be processed within a time limit of 6 hours, may need 25 bot runners for the data set to be processed within a time limit of 4 hours, etc. Accordingly, a time limit within which the data is to be processed (e.g., 3 hours, 5 hours, 16 hours, one or more days, etc.) may also be provided as input at S200. The fixed number of bot runners or predetermined number of bot runners are configurable parameters that may be determined based on experiments and/or empirical studies.

In yet another example embodiment, the number of bot runners may be determined based on processing capabilities of each bot runner (e.g., average time to process a data set of a certain size) and time limit for processing the entire data set. For example, a data set may need to be processed within six or eight hours and that each bot runner, on average, may process a data subset (batch) in 2 hours. Therefore, controller may determine that 20 bot runners may be needed to ensure that the data set is processed within six or eight hours.

In yet another example, a machine learning algorithm may be implemented on controller 101 and may be trained to determine a needed/required number of bot runners for processing a given data set, based on factors including, but not limited to, a size of the data set, a number of available bot runners, a time limit required for processing the data set, average processing time of each bot runner, etc.

At S204, controller 101, assigns bots for execution by bot runners identified at S202. There may be several types of bots defined for execution. One example bot is a distribution bot, which as will be described below, when executed, accesses the data set and distributes (and/or redistributes) batches or subsets of the data set to different bot runners for processing. Another example bot is a consume bot, which as will be described below, when executed on all identified bot runners, processes batches assigned thereto. A distribution bot may be executed on one of the bot runners while consume bot may be executed on all identified bot runners. Another example bot is a summary bot, which as will be described below, when executed, generates summaries of data processing performed by each bot runner and can generated a final/comprehensive report of data processing for the entire data set. Alternatively, functionalities of summary bot may be performed by or incorporated into distribution bot, which may be executed on a single bot runner.

In one example, the processes at S200, S202 and S204 is performed once every time there is a new data set received at S200 for processing and thereafter, for implementing the processing of such data set, processes at S206 to S220 may be iteratively repeated until the data set is processed.

With input data/data set to be processed identified and bot runners assigned, at S206, controller 101 executes distribution bot. In one example, distribution bot access the spreadsheet that is a list of available/identified bot runners. Given a total size of the data set and a size of each batch to be assigned to a given bot runner, distribution bot, accesses the input data, splits them into batches or subsets of data (each having the size assigned to each batch) and assigns the batches to bot runners for execution. For example, assuming that 20 bot runners are included in the list at S202, that input data includes 250000 records (e.g., consumer records) to process and a maximum size of 5000 records for each bot runner to process at any given time, distribution bot splits the 250000 records into 50 files of 5000 records each (50 batches) and assigns at least two to each of the 20 bot runners (with 10 bot runners receiving an additional batch each) for a total of 50 batches assigned.

In one example, distribution bot creates a folder for each bot runner (for each of the 20 bot runners). Each such folder may include several files. There is a file created for each batch assigned to corresponding bot runner. In one example, there is a summary file that may be created to the first bot runner on the list that may include the results of data processing of all bot runners once completed. Summary file for the first bot runner may be processed by execution of summary bot once all bot runners have completed processing of all batches.

In one example, distribution bot distributes batches to corresponding bot runners for processing. Furthermore, list of bot runners created at S202 may be updated to include batches assigned to each respective bot runner. Therefore, such list may serve to provide a holistic view of multi-bot architecture and data processing status of each bot runner.

Once all data batches are assigned to their respective bot runners and corresponding folders are created and batches are transferred to their respective folders, at S208, controller 101 executes consume bot on all bot runners. In one example and in order to execute consume bot on all bot runners, controller 101 ensures that all bot runners are ready by checking that each is properly being executed on a corresponding client 102 of controller 101, email notifications are configured, access to folders are available by each bot runner, access to spreadsheet/list is available, etc. This may be referred to as a bot runner preparation process.

Thereafter, consume bot is executed in parallel and simultaneously on all identified bot runners. Accordingly, each bot runner accesses corresponding folder created by distribution bot described above at S206, retrieves data batch, and processes the same. Once completed, same bot runner proceeds to processing the next assigned batch until all batches are processed. As will be described below, upon successful completion of processing of each batch a notification may be generated and sent (e.g., as an email) from each of the network clients 102 to VDI 105 indicating that a batch is successfully processed. Similar notification may be sent if an error occurs during processing.

Step S208 allows for parallel and simultaneous processing of batches by all bot runners thus enabling a multi bot processing of data that is subject to a time limit.

At S210, controller 101 monitors the status of processing by all bot runners. An example activities window that provides a visual progress on data processing by all bot runners may be provided on VDI 105. An example activity window will be further described below.

As noted, at any given time during processing, a particular bot runner may experience errors (for various reasons) in processing a batch. Once an error occurs, corresponding bot runner, through execution of consume bot, may generate a notification (e.g., an email) indicating the error. In one example, such notification is accompanied by a log of errors occurred during processing.

At S212, controller 101 determines if an error notification is received. If at S212, controller 101 detects receipt of an error notification, then at S214, controller 101 executes a correction process. In one example, a correction process may be to provide an alert to a network operator via VDI 105 for reviewing the error log and fixing the code of the software bot, data format, relaunching of the software bot, redistribution of the batch under processing, etc., according to any known or to be developed method.

In another example, the correction process may include taking a batch for which the error occurred and redistribute it to other bot runners for processing. This correction process may be performed via a manual command provided by a network operator via VDI 105. In one instance, redistribution of batches (for which errors occurred) may be set as a default correction process unless overridden by a network operator through VDI 105. Batch redistribution may involve identifying an idle bot runner and assigning the batch thereto (e.g., moving the error prone batch to the folder of the idle bot runner). In another example, a redistribution may simply involve assigning the error prone batch to another bot runner (idle or not) for processing by moving the error prone batch to a folder of the newly assigned bot runner for processing.

After execution of the correction process at S214, the process returns to S208, where controller 101 executes consume bot for processing of the error prone batch by the newly assigned (or the same) bot runner and steps S208 to S212 are repeated.

Referring back to S212, if controller 101 (consume bot of controller 101) determines that an error notification is not received, controller 101 generates a completion notification after each batch is processed and can provide the same to an operator via VDI 105.

At S216, summary bot of controller 101 receives completion notification not in the form of mail but as output files. The notification may also be in the form of an email with an attached log of the processed batch.

At S218, the summary bot determines if all batches have been successfully processed once completion notification is received from each of the consume bots. If at S218, a determination is made that there are still batches being processed or are yet to be processed, the process reverts back to S212 and S212 to S218 are repeated until a determination is made, at S218, that all batches are processed. At this stage, the entire data set (input data) is processed.

Thereafter, at S220, controller 101 generates a summary report for the processed data set. The report may be in any known or to be developed format such as a tabular format. Such report may be generated by execution of a summary bot, as described above. For example, the report may be a spreadsheet with an overall summary of information such as number of accounts analyzed, current credit limit of each account, accounts eligible for credit increase, accounts not eligible for credit increase, accounts to receive credit decrease, etc. The report may also include a breakdown of data batches processed by each bot runner. In another example, the report may be, or include, visual representation of the results of processing (e.g., a pie chart, a graphical representation, etc.). An example summary report will be described below with reference to FIG. 6.

With process of multi-bot data processing described with reference to FIG. 2, the disclosure now provides several examples of outputs and results of various stages of the process of FIG. 2.

FIG. 3 is an example list of bot runners, according to one aspect of the present disclosure. As described with reference to S202 of FIG. 2, controller 101 identifies a list of bot runners that may be complied in a form of a spreadsheet. Table 300 of FIG. 3 is one example of 20 bot runners identified for processing a data set. Each entry of table 300 is an identifier of a different bot runner (available in device pool 106 of FIG. 1).

In describing FIG. 3 and ensuing figures in this disclosure, a non-limiting assumption is made that the data set to be processed includes 250,000 records/entries to be processed and that a size of each batch is to be 5000 files, maximum.

Figure 4:
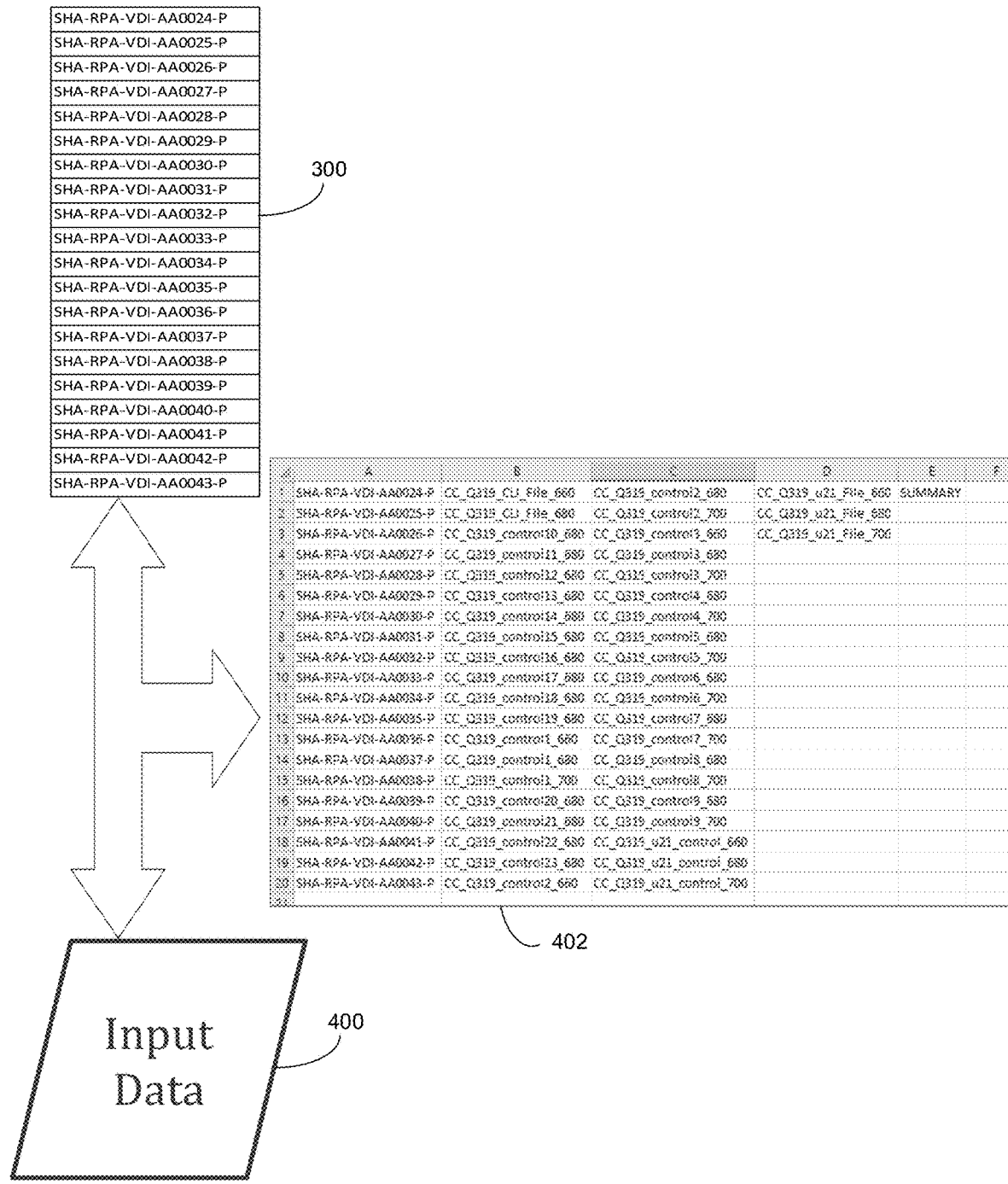
FIG. 4 illustrates an output of execution of distribution bot of FIG. 2, according to one aspect of the present disclosure.

FIG. 4 illustrates an output of execution of distribution bot of FIG. 2, according to one aspect of the present disclosure. FIG. 4 illustrates the process where execution of distribution bot on one bot runner results in taking data set 400 and list 300 and dividing up data set 400 in batches and assigning them to bot runners on list 300. With the assumptions of 250,000 records and a batch size of 5000 records, 50 batches are created and assigned to bot runners on list 300, where each bot runner on list 300 is assigned at least two batches for processing. Table 402 illustrates the result of assigning batches to bot runners. Table 402 can be considered an updated version of list 300 that also provides information on batches assigned to each bot runner.

Figure 5:
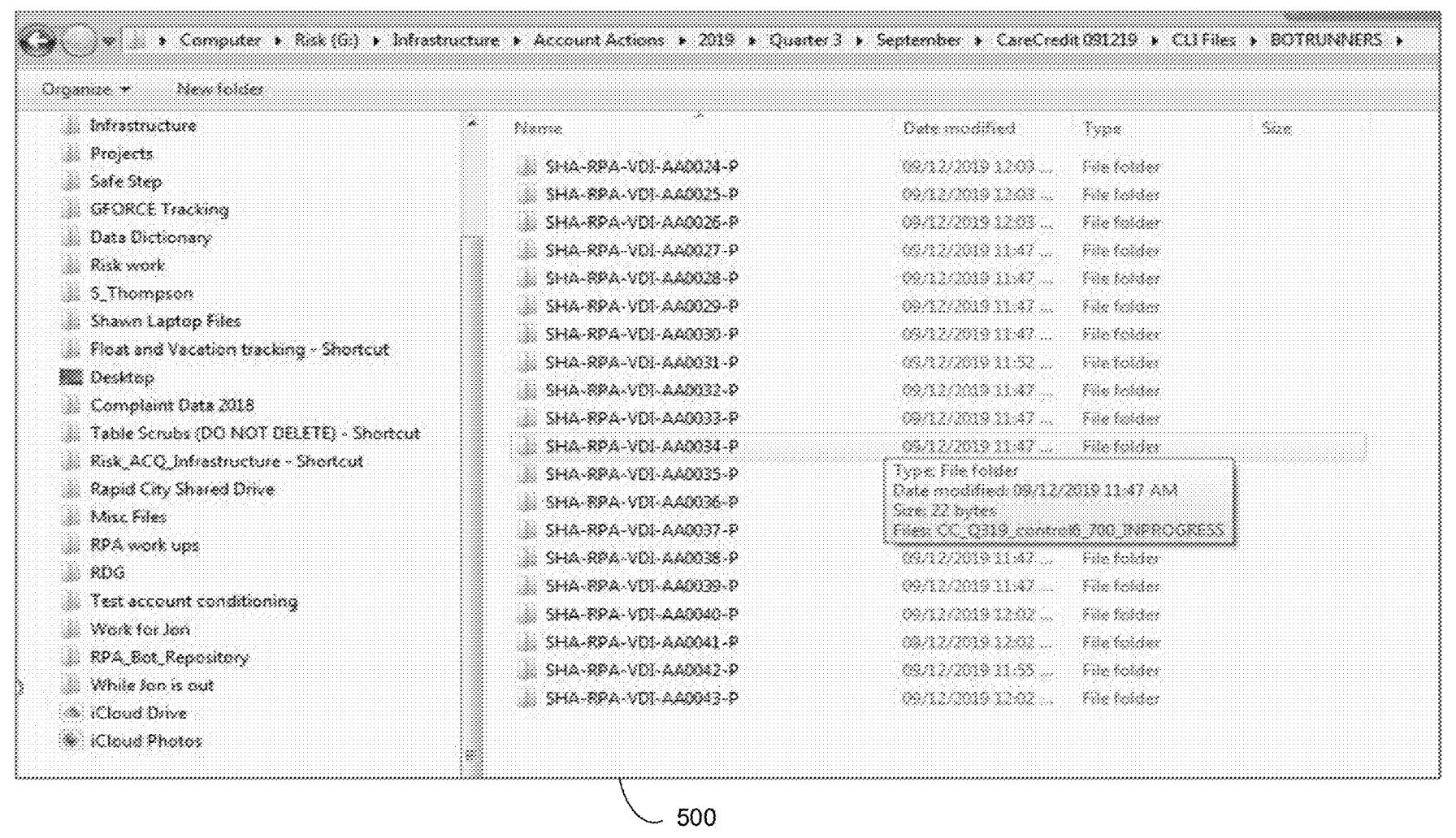

FIG. 5 illustrates example folders created through execution of distribution bot of FIG. 2, according to one aspect of the present disclosure. As described above with reference to S206 of FIG. 2, execution of distribution bot results in creation of folders for bot runners of list 300 for each batch assigned thereto. For example, table 300 identifies bot runners SHA-RPA-VDI-AA00XX-P, with XX=24-43. Table 500 shows a separate folder created for each one of bot runners SHA-RPA-VDI-AA00XX-P, with XX=24-43. As described above, there may also be a summary file associated with the first bot runner on list 300. A summary file indicates the role of summarizing information determined at S220 after all batches are successfully processed by all bot runners.

Figure 6:
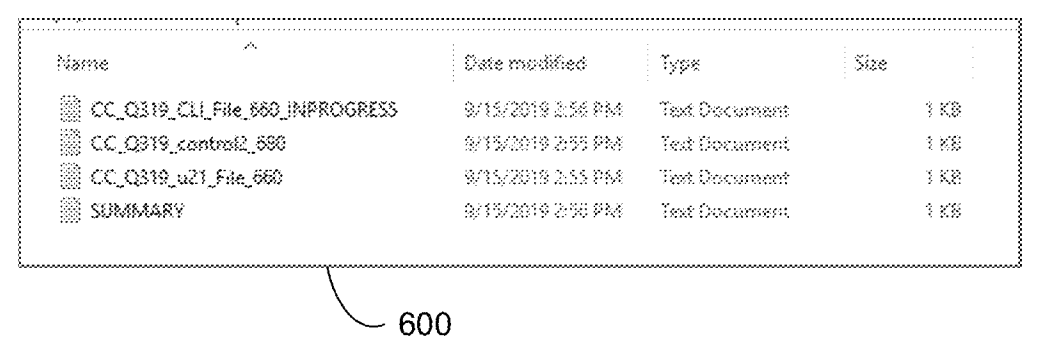

FIG. 6 illustrates files of one folder of FIG. 5, according to one aspect of the present disclosure. Screen 600 shows files created for bot runner SHA-RPA-VDI-AA0024-P, which is the first bot runner on list 300. As can be seen from table 402, batches CC_Q319_CLI_File_660, CC-Q319_control2_680 and CC_Q319_u21_File_660 are assigned to bot runner SHA-RPA-VDI-AA0024-P. Distribution bot, as described, creates placeholder text files corresponding to each of batches CC_Q319_CLI_File_660, CC-Q319_control2_680, CC_Q319_u21_File_660, from data set 400 and copies them into their respective folder for processing by SHA-RPA-VDI-AA0024-P.

Figure 7:
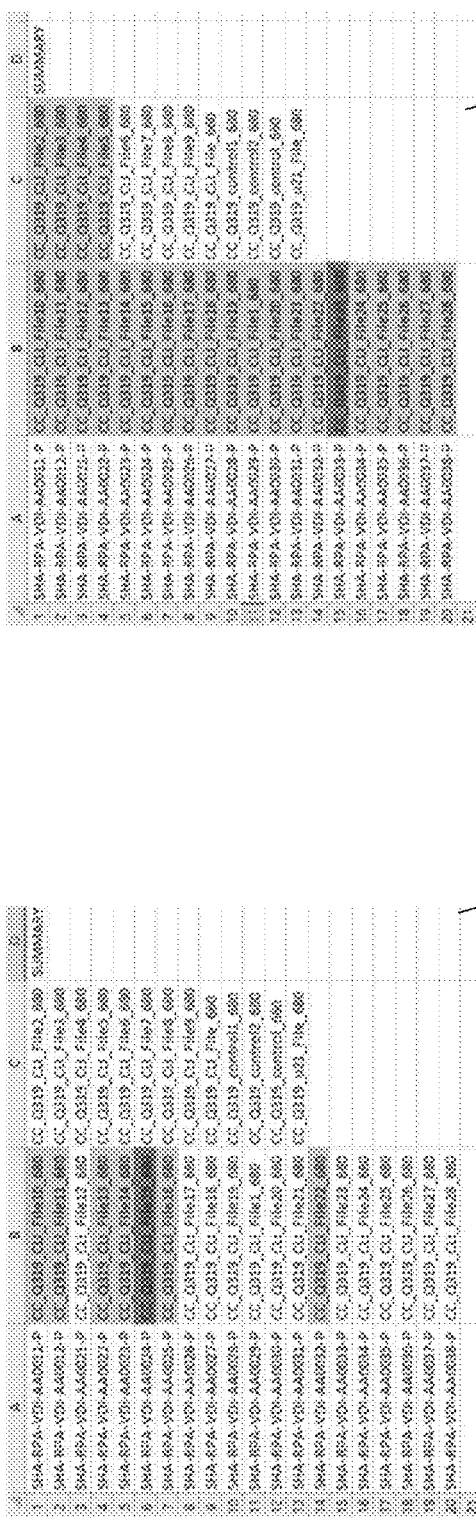
FIG. 7 is an example activities window described above with reference to FIG. 2, according to one aspect of the present disclosure.
Figure 7:
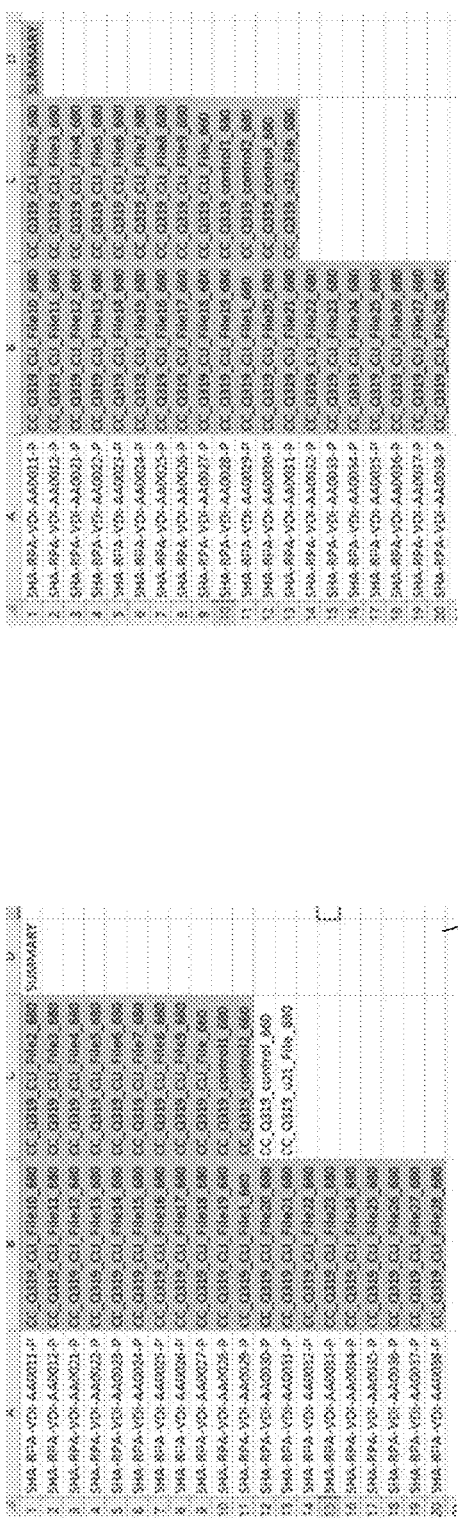

FIG. 7 is an example activities window described above with reference to FIG. 2, according to one aspect of the present disclosure.

FIG. 7 illustrates several snapshots of activities window, namely snapshots 700, 702, 704 and 706. Activities window, in one example, is a color coded version of table/spreadsheet 402 of FIG. 4, in which successfully processed batches are identified using a first color (e.g., in green), in progress batches are identified using a second color (e.g., white), and batches during processing of which an error occurred are identified using a third color (e.g. red). Snapshots 700, 702, 704 and 706 may be a time series of progress of data processing by bot runners of list 300. In conjunction with and/or alternatively, email notifications may be relied upon to update an operator (e.g., via VDI 105) on the progress of processing of batches.

Snapshot 700 is one example, where all bot runners are continuously and simultaneously processing different batches, of which 6 has been successfully processed (e.g., batches 700-1, 700-2, 700-3, 700-4, 700-6, and 700-7), 1 has had an error (e.g., batch 700-5) and remaining batches are yet to be processed.

Upon occurrence of failure batch 700-5, controller 101 performs S214, where same (or different) bot runner re-processes the same batch. Snapshot 702 is another example, where the batch with error (e.g., batch 702-1 that is different than the batch 700-5 with error in snapshot 700) is not successfully processed along with 23 other batches (e.g., batches in rows B1 to B14, B16 to B20, and C1 to C4), and 9 batches (e.g., batches in rows C5 to C13) remain to be processed/are in progress of being processed.

Snapshot 704 is another example where both batches with errors in snapshots 700 and 702 are now fixed and successfully processed and that all batches except two (e.g., batches in rows C12 and C13) are successfully processed.

Snapshot 706 is a final example, where all batches including summary are all processed and a report of data processing may be presented per S220 of FIG. 2.

Figure 8:
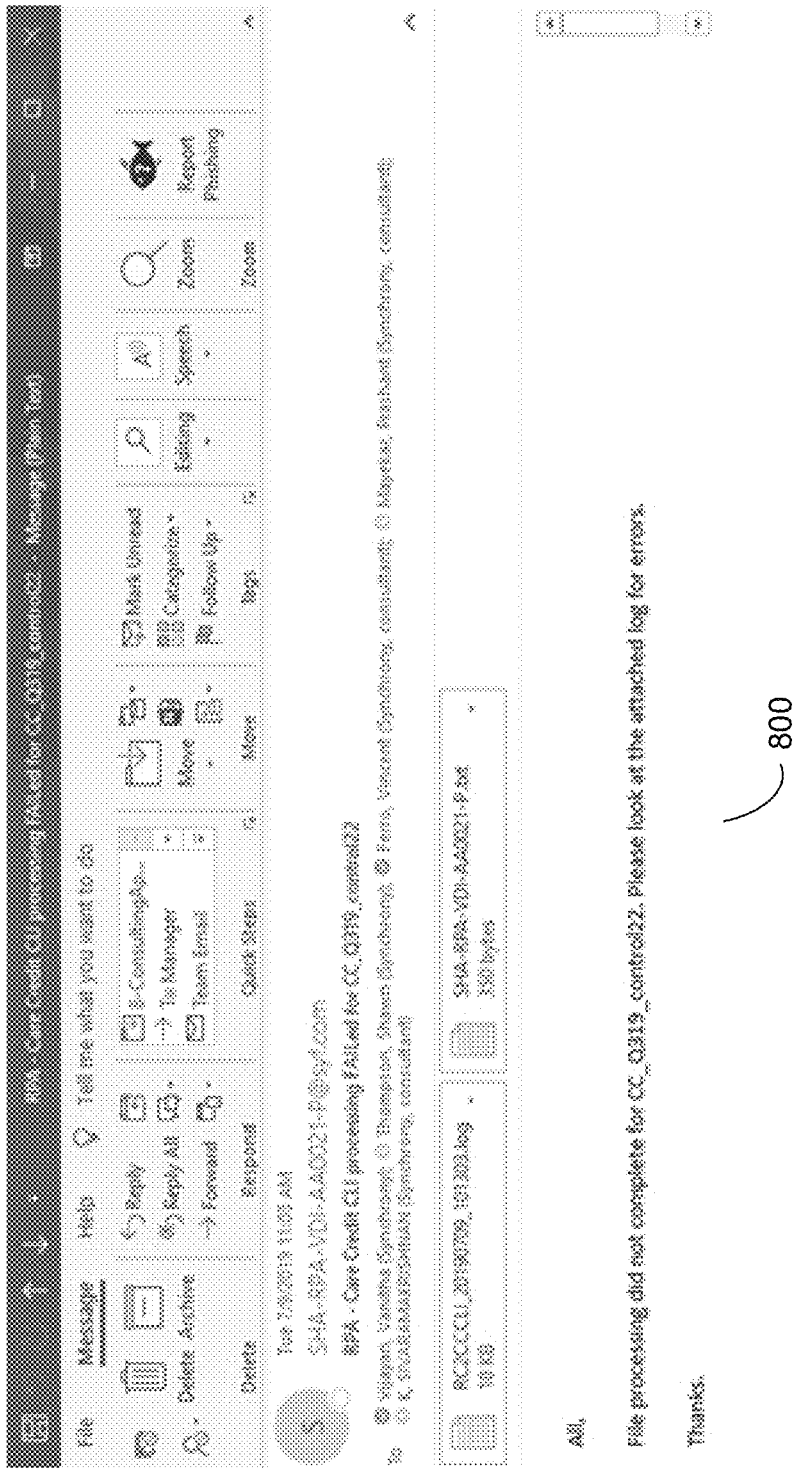
FIG. 8 is a snapshot of a notification generated in response to a processing error, according to one aspect of the present disclosure.

FIG. 8 is a snapshot of a notification generated in response to a processing error, according to one aspect of the present disclosure. Screen 800 is an example of an automatically generated email notification informing a system operator that an error has occurred in processing a particular batch. In this example email, the particular batch with processing error is identified and an error log is also attached to the email.

Figure 9:
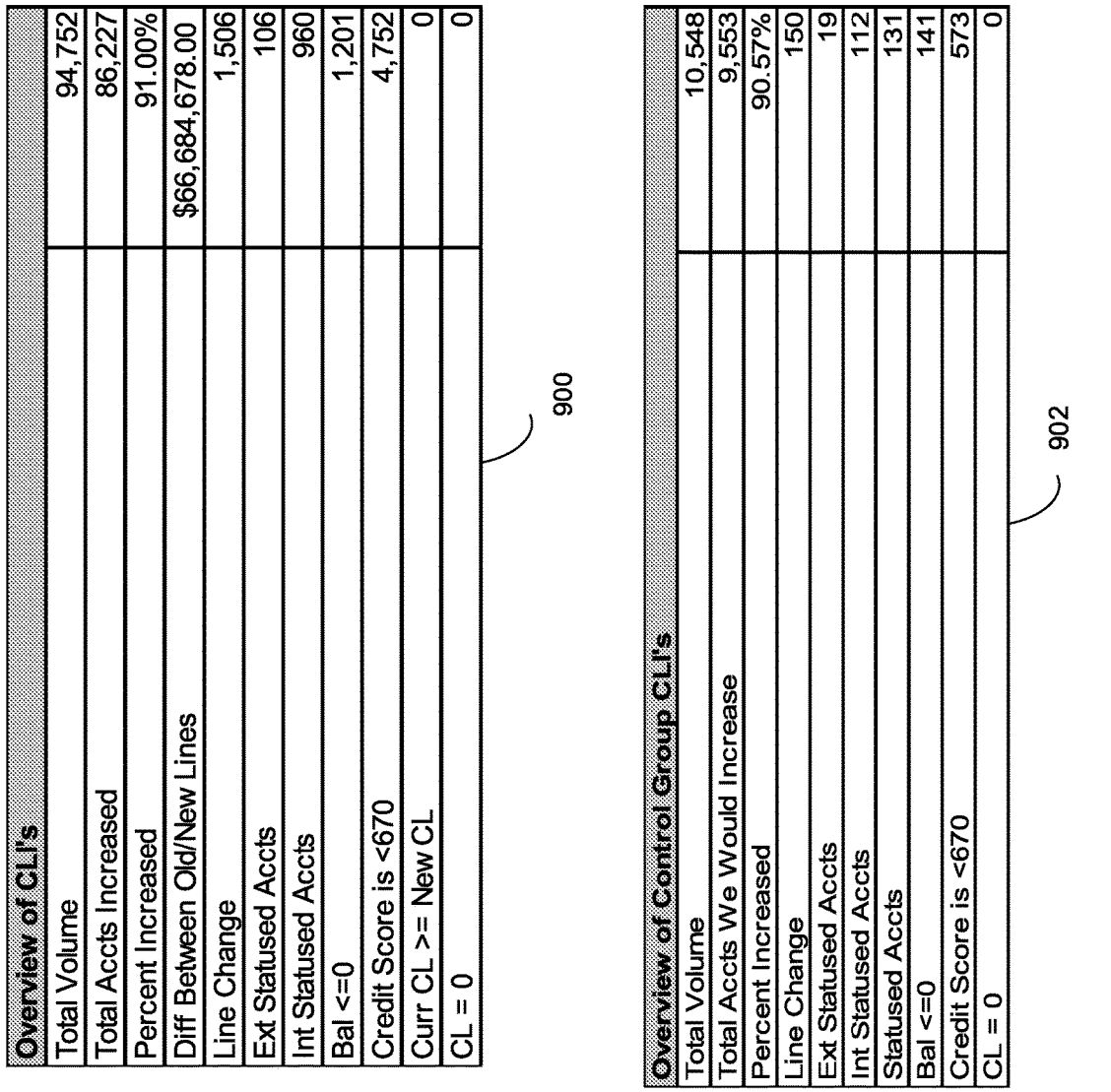
FIG. 9 is an example summary report generated after completion of data processing of FIG. 2, according to one aspect of the present disclosure.

FIG. 9 is an example summary report generated after completion of data processing of FIG. 2, according to one aspect of the present disclosure. As noted above, summary of the processed data set may be presented in various forms to a network management and operation. For example, in the context of processing financial and spending data of consumers for purposes of identifying accounts eligible for credit increase, table 900 illustrates key parameters of the processed data set. Total volume may be a total number of records in data set to be processed (e.g., total accounts of consumers), total accounts increased may be indicative of a number of accounts that qualified for and received a credit line increase, portion of accounts with credit limit increase as a percentage of all accounts processed, difference between new and old credit lines among all accounts, number of accounts that had a credit line change in the last two months, number of accounts with a certain credit score or less, number of accounts excluded from credit line increases, etc.

Another example summary report may be table 902, which provides similar data as table 900 but for a control group of eligible accounts. Such control group in example of table 902 is the number of account holders that may have similar account activities (e.g., spending) as account holders in table 900 (which may be referred to as test groups) but with no credit limit increase. In other words, accounts in test group of table 900 may have the same or similar type of accounts as those in the control group of table 902 and accounts in both group may be eligible for credit increase. However, for purposes of determining underlying strategy for credit line increases, accounts in the test group may have their credit line increased while accounts in the control group will have their credit lines unchanged.

With various examples of multi bot data processing described with reference to FIGS. 1-9, the disclosure now turns to example computing system that can be utilized to implement various components of multi-bot architecture of FIG. 1 including, controller 101, devices (bot runners) in device pool 106, etc.

Figure 10:
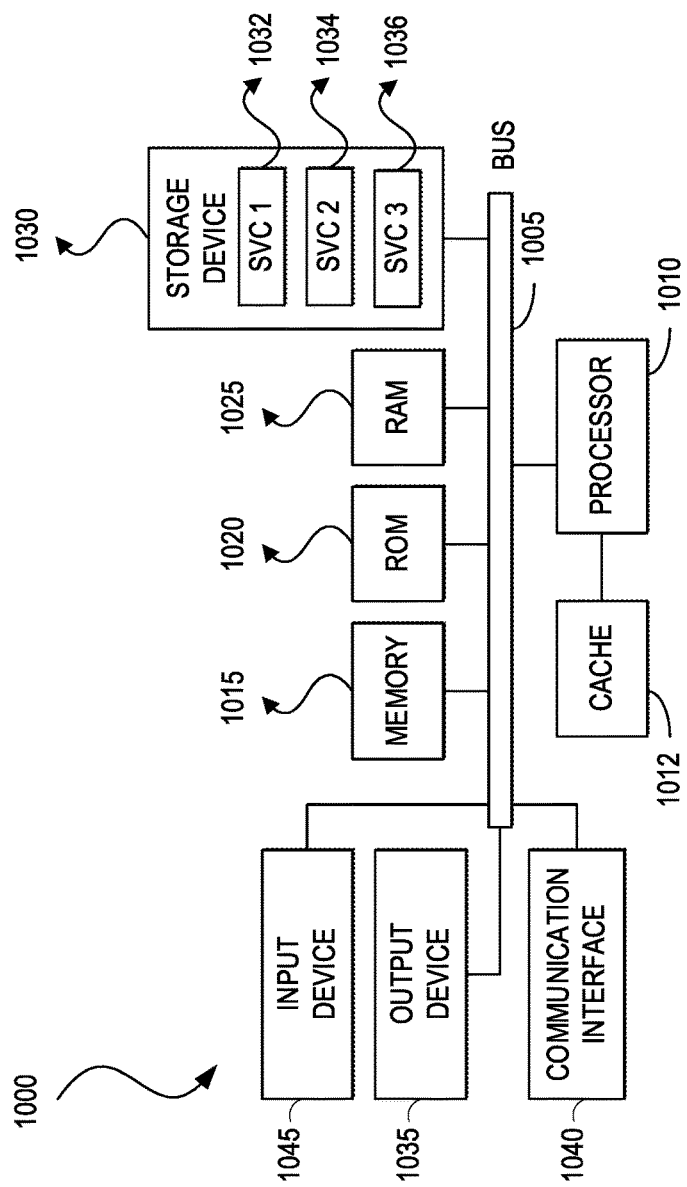
FIG. 10 illustrates an example computing system, according to one aspect of the present disclosure.

FIG. 10 illustrates an example computing system, according to one aspect of the present disclosure. FIG. 10 shows an example of computing system 1000 with various components of it connected via connection 1005. Connection 1005 can be a physical connection via a bus, or a direct connection into processor 1010, such as in a chipset architecture. Connection 1005 can also be a virtual connection, networked connection, or logical connection.

In some embodiments computing system 1000 is a distributed system in which the functions described in this disclosure can be distributed within a datacenter, multiple datacenters, a peer network, etc. In some embodiments, one or more of the described system components represents many such components each performing some or all of the function for which the component is described. In some embodiments, the components can be physical or virtual devices.

Example computing system 1000 includes at least one processing unit (CPU or processor) 1010 and connection 1005 that couples various system components including system memory 1015, such as read only memory (ROM) 1020 and random access memory (RAM) 1025 to processor 1010. Computing system 1000 can include a cache of high-speed memory 1012 connected directly with, in close proximity to, or integrated as part of processor 1010.

Processor 1010 can include any general purpose processor and a hardware service or software service, such as services 1032, 1034, and 1036 stored in storage device 1030, configured to control processor 1010 as well as a special-purpose processor where software instructions are incorporated into the actual processor design. Processor 1010 may essentially be a completely self-contained computing system, containing multiple cores or processors, a bus, memory controller, cache, etc. A multi-core processor may be symmetric or asymmetric.

To enable user interaction, computing system 1000 includes an input device 1045, which can represent any number of input mechanisms, such as a microphone for speech, a touch-sensitive screen for gesture or graphical input, keyboard, mouse, motion input, speech, etc. Computing system 1000 can also include output device 1035, which can be one or more of a number of output mechanisms known to those of skill in the art. In some instances, multimodal systems can enable a user to provide multiple types of input/output to communicate with computing system 1000. Computing system 1000 can include communications interface 1040, which can generally govern and manage the user input and system output. There is no restriction on operating on any particular hardware arrangement and therefore the basic features here may easily be substituted for improved hardware or firmware arrangements as they are developed.

Storage device 1030 can be a non-volatile memory device and can be a hard disk or other types of computer readable media which can store data that are accessible by a computer, such as magnetic cassettes, flash memory cards, solid state memory devices, digital versatile disks, cartridges, random access memories (RAMs), read only memory (ROM), and/or some combination of these devices.

The storage device 1030 can include software services, servers, services, etc., that when the code that defines such software is executed by the processor 1010, it causes the system to perform a function. In some embodiments, a hardware service that performs a particular function can include the software component stored in a computer-readable medium in connection with the necessary hardware components, such as processor 1010, connection 1005, output device 1035, etc., to carry out the function.

For clarity of explanation, in some instances the various embodiments may be presented as including individual functional blocks including functional blocks comprising devices, device components, steps or routines in a method embodied in software, or combinations of hardware and software.

Claim language reciting "at least one of" refers to at least one of a set and indicates that one member of the set or multiple members of the set satisfy the claim. For example, claim language reciting "at least one of A and B" means A, B, or A and B.

Like reference numbers and designations in the various drawings indicate like elements.

The disclosed secure and automated system for processing of time sensitive data can be performed using a computing server. An example computing server can include a processor (e.g., a central processing unit), memory, non-volatile memory, and an interface device. The memory may store data and/or and one or more code sets, software, scripts, etc. The components of the computer server can be coupled together via a bus or through some other known or convenient device. The processor may be configured to carry out all or part of methods described herein for example by executing code for example stored in memory. One or more of a user device or computer, a provider server or server, or a suspended database update server may include the components of the computing server or variations on such a server.

This disclosure contemplates the computer server taking any suitable physical form. As example and not by way of limitation, the computer server may be an embedded computer server, a server-on-chip (SOC), a single-board computer server (SBC) (such as, for example, a computer-on-module (COM) or server-on-module (SOM)), a desktop computer server, a laptop or notebook computer server, an interactive kiosk, a mainframe, a mesh of computer servers, a mobile telephone, a personal digital assistant (PDA), a server, or a combination of two or more of these. Where appropriate, the computer server may include one or more computer servers; be unitary or distributed; span multiple locations; span multiple machines; and/or reside in a cloud, which may include one or more cloud components in one or more networks. Where appropriate, one or more computer servers may perform without substantial spatial or temporal limitation one or more steps of one or more methods described or illustrated herein. As an example and not by way of limitation, one or more computer servers may perform in real time or in batch mode one or more steps of one or more methods described or illustrated herein. One or more computer servers may perform at different times or at different locations one or more steps of one or more methods described or illustrated herein, where appropriate.

The processor may be, for example, be a conventional microprocessor such as an Intel Pentium microprocessor or Motorola power PC microprocessor. One of skill in the relevant art will recognize that the terms "machine-readable (storage) medium" or "computer-readable (storage) medium" include any type of device that is accessible by the processor.

The memory can be coupled to the processor by, for example, a bus. The memory can include, by way of example but not limitation, random access memory (RAM), such as dynamic RAM (DRAM) and static RAM (SRAM). The memory can be local, remote, or distributed.

The bus can also couples the processor to the non-volatile memory and drive unit. The non-volatile memory is often a magnetic floppy or hard disk, a magnetic-optical disk, an optical disk, a read-only memory (ROM), such as a CD-ROM, EPROM, or EEPROM, a magnetic or optical card, or another form of storage for large amounts of data. Some of this data is often written, by a direct memory access process, into memory during execution of software in the computer. The non-volatile storage can be local, remote, or distributed. The non-volatile memory is optional because servers can be created with all applicable data available in memory. A typical computer server will usually include at least a processor, memory, and a device (e.g., a bus) coupling the memory to the processor.

Software can be stored in the non-volatile memory and/or the drive unit. Indeed, for large programs, it may not even be possible to store the entire program in the memory. Nevertheless, it should be understood that for software to run, if necessary, it is moved to a computer readable location appropriate for processing, and for illustrative purposes, that location is referred to as the memory herein. Even when software is moved to the memory for execution, the processor can make use of hardware registers to store values associated with the software, and local cache that, ideally, serves to speed up execution. As used herein, a software program is assumed to be stored at any known or convenient location (from non-volatile storage to hardware registers), when the software program is referred to as "implemented in a computer-readable medium." A processor is considered to be "configured to execute a program" when at least one value associated with the program is stored in a register readable by the processor.

The bus can also couples the processor to the network interface device. The interface can include one or more of a modem or network interface. It will be appreciated that a modem or network interface can be considered to be part of the computer server. The interface can include an analog modem, Integrated Services Digital network (ISDN0 modem, cable modem, token ring interface, satellite transmission interface (e.g., "direct PC"), or other interfaces for coupling a computer server to other computer servers. The interface can include one or more input and/or output (I/O) devices. The I/O devices can include, by way of example but not limitation, a keyboard, a mouse or other pointing device, disk drives, printers, a scanner, and other input and/or output devices, including a display device. The display device can include, by way of example but not limitation, a cathode ray tube (CRT), liquid crystal display (LCD), or some other applicable known or convenient display device.

In operation, the computer server can be controlled by operating server software that includes a file management server, such as a disk operating server. One example of operating server software with associated file management server software is the family of operating servers known as Windows® from Microsoft Corporation of Redmond, WA, and their associated file management servers. Another example of operating server software with its associated file management server software is the Linux™ operating server and its associated file management server. The file management server can be stored in the non-volatile memory and/or drive unit and can cause the processor to execute the various acts required by the operating server to input and output data and to store data in the memory, including storing files on the non-volatile memory and/or drive unit.

Some portions of the detailed description may be presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities. Usually, though not necessarily, these quantities take the form of electrical or magnetic signals capable of being stored, transferred, combined, compared, and otherwise manipulated. It has proven convenient at times, principally for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or "generating" or the like, refer to the action and processes of a computer server, or similar electronic computing device, that manipulates and transforms data represented as physical (electronic) quantities within registers and memories of the computer server into other data similarly represented as physical quantities within the computer server memories or registers or other such information storage, transmission or display devices.

The algorithms and displays presented herein are not inherently related to any particular computer or other apparatus. Various general purpose servers may be used with programs in accordance with the teachings herein, or it may prove convenient to construct more specialized apparatus to perform the methods of some examples. The required structure for a variety of these servers will appear from the description below. In addition, the techniques are not described with reference to any particular programming language, and various examples may thus be implemented using a variety of programming languages.

In various implementations, the server operates as a standalone device or may be connected (e.g., networked) to other servers. In a networked deployment, the server may operate in the capacity of a server or a client server in a client-server network environment, or as a peer server in a peer-to-peer (or distributed) network environment.

The server may be a server computer, a client computer, a personal computer (PC), a tablet PC, a laptop computer, a set-top box (STB), a personal digital assistant (PDA), a cellular telephone, an iPhone, a Blackberry, a processor, a telephone, a web appliance, a network router, switch or bridge, or any server capable of executing a set of instructions (sequential or otherwise) that specify actions to be taken by that server.

While the machine-readable medium or machine-readable storage medium is shown, by way of example, to be a single medium, the term "machine-readable medium" and "machine-readable storage medium" should be taken to include a single medium or multiple media (e.g., a centralized or distributed database, and/or associated caches and servers) that store the one or more sets of instructions. The term "machine-readable medium" and "machine-readable storage medium" shall also be taken to include any medium that is capable of storing, encoding, or carrying a set of instructions for execution by the server and that cause the server to perform any one or more of the methodologies or modules of disclosed herein.

In general, the routines executed to implement the implementations of the disclosure, may be implemented as part of an operating server or a specific application, component, program, object, module or sequence of instructions referred to as "computer programs." The computer programs typically comprise one or more instructions set at various times in various memory and storage devices in a computer, and that, when read and executed by one or more processing units or processors in a computer, cause the computer to perform operations to execute elements involving the various aspects of the disclosure.

Moreover, while examples have been described in the context of fully functioning computers and computer servers, those skilled in the art will appreciate that the various examples are capable of being distributed as a program object in a variety of forms, and that the disclosure applies equally regardless of the particular type of machine or computer-readable media used to actually effect the distribution.

Further examples of machine-readable storage media, machine-readable media, or computer-readable (storage) media include but are not limited to recordable type media such as volatile and non-volatile memory devices, floppy and other removable disks, hard disk drives, optical disks (e.g., Compact Disk Read-Only Memory (CD ROMS), Digital Versatile Disks, (DVDs), etc.), among others, and transmission type media such as digital and analog communication links.

In some circumstances, operation of a memory device, such as a change in state from a binary one to a binary zero or vice-versa, for example, may comprise a transformation, such as a physical transformation. With particular types of memory devices, such a physical transformation may comprise a physical transformation of an article to a different state or thing. For example, but without limitation, for some types of memory devices, a change in state may involve an accumulation and storage of charge or a release of stored charge. Likewise, in other memory devices, a change of state may comprise a physical change or transformation in magnetic orientation or a physical change or transformation in molecular structure, such as from crystalline to amorphous or vice versa. The foregoing is not intended to be an exhaustive list of all examples in which a change in state for a binary one to a binary zero or vice-versa in a memory device may comprise a transformation, such as a physical transformation. Rather, the foregoing is intended as illustrative examples.

A storage medium typically may be non-transitory or comprise a non-transitory device. In this context, a non-transitory storage medium may include a device that is tangible, meaning that the device has a concrete physical form, although the device may change its physical state. Thus, for example, non-transitory refers to a device remaining tangible despite this change in state.

The above description and drawings are illustrative and are not to be construed as limiting the subject matter to the precise forms disclosed. Persons skilled in the relevant art can appreciate that many modifications and variations are possible in light of the above disclosure. Numerous specific details are described to provide a thorough understanding of the disclosure. However, in certain instances, well-known or conventional details are not described in order to avoid obscuring the description.

As used herein, the terms "connected," "coupled," or any variant thereof when applying to modules of a server, means any connection or coupling, either direct or indirect, between two or more elements; the coupling of connection between the elements can be physical, logical, or any combination thereof. Additionally, the words "herein," "above," "below," and words of similar import, when used in this application, shall refer to this application as a whole and not to any particular portions of this application. Where the context permits, words in the above Detailed Description using the singular or plural number may also include the plural or singular number respectively. The word "or," in reference to a list of two or more items, covers all of the following interpretations of the word: any of the items in the list, all of the items in the list, or any combination of the items in the list.

Those of skill in the art will appreciate that the disclosed subject matter may be embodied in other forms and manners not shown below. It is understood that the use of relational terms, if any, such as first, second, top and bottom, and the like are used solely for distinguishing one entity or action from another, without necessarily requiring or implying any such actual relationship or order between such entities or actions.

While processes or blocks are presented in a given order, alternative implementations may perform routines having steps, or employ servers having blocks, in a different order, and some processes or blocks may be deleted, moved, added, subdivided, substituted, combined, and/or modified to provide alternative or sub combinations. Each of these processes or blocks may be implemented in a variety of different ways. Also, while processes or blocks are at times shown as being performed in series, these processes or blocks may instead be performed in parallel, or may be performed at different times. Further any specific numbers noted herein are only examples: alternative implementations may employ differing values or ranges.

The teachings of the disclosure provided herein can be applied to other servers, not necessarily the server described above. The elements and acts of the various examples described above can be combined to provide further examples.

Any patents and applications and other references noted above, including any that may be listed in accompanying filing papers, are incorporated herein by reference. Aspects of the disclosure can be modified, if necessary, to employ the servers, functions, and concepts of the various references described above to provide yet further examples of the disclosure.

These and other changes can be made to the disclosure in light of the above Detailed Description. While the above description describes certain examples, and describes the best mode contemplated, no matter how detailed the above appears in text, the teachings can be practiced in many ways. Details of the server may vary considerably in its implementation details, while still being encompassed by the subject matter disclosed herein. As noted above, particular terminology used when describing certain features or aspects of the disclosure should not be taken to imply that the terminology is being redefined herein to be restricted to any specific characteristics, features, or aspects of the disclosure with which that terminology is associated. In general, the terms used in the following claims should not be construed to limit the disclosure to the specific implementations disclosed in the specification, unless the above Detailed Description section explicitly defines such terms. Accordingly, the actual scope of the disclosure encompasses not only the disclosed implementations, but also all equivalent ways of practicing or implementing the disclosure under the claims.

While certain aspects of the disclosure are presented below in certain claim forms, the inventors contemplate the various aspects of the disclosure in any number of claim forms. Any claims intended to be treated under 35 U.S.C. § 112(f) will begin with the words "means for". Accordingly, the applicant reserves the right to add additional claims after filing the application to pursue such additional claim forms for other aspects of the disclosure.

The terms used in this specification generally have their ordinary meanings in the art, within the context of the disclosure, and in the specific context where each term is used. Certain terms that are used to describe the disclosure are discussed above, or elsewhere in the specification, to provide additional guidance to the practitioner regarding the description of the disclosure. For convenience, certain terms may be highlighted, for example using capitalization, italics, and/or quotation marks. The use of highlighting has no influence on the scope and meaning of a term; the scope and meaning of a term is the same, in the same context, whether or not it is highlighted. It will be appreciated that same element can be described in more than one way.

Consequently, alternative language and synonyms may be used for any one or more of the terms discussed herein, nor is any special significance to be placed upon whether or not a term is elaborated or discussed herein. Synonyms for certain terms are provided. A recital of one or more synonyms does not exclude the use of other synonyms. The use of examples anywhere in this specification including examples of any terms discussed herein is illustrative only, and is not intended to further limit the scope and meaning of the disclosure or of any exemplified term. Likewise, the disclosure is not limited to various examples given in this specification.

Without intent to further limit the scope of the disclosure, examples of instruments, apparatus, methods and their related results according to the examples of the present disclosure are given below. Note that titles or subtitles may be used in the examples for convenience of a reader, which in no way should limit the scope of the disclosure. Unless otherwise defined, all technical and scientific terms used herein have the same meaning as commonly understood by one of ordinary skill in the art to which this disclosure pertains. In the case of conflict, the present document, including definitions will control.

Some portions of this description describe examples in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In some examples, a software module is implemented with a computer program object comprising a computer-readable medium containing computer program code, which can be executed by a computer processor for performing any or all of the steps, operations, or processes described.

Examples may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer server bus. Furthermore, any computing servers referred to in the specification may include a single processor or may be architectures employing multiple processor designs for increased computing capability.

Examples may also relate to an object that is produced by a computing process described herein. Such an object may comprise information resulting from a computing process, where the information is stored on a non-transitory, tangible computer readable storage medium and may include any implementation of a computer program object or other data combination described herein.

The language used in the specification has been principally selected for readability and instructional purposes, and it may not have been selected to delineate or circumscribe the subject matter. It is therefore intended that the scope of this disclosure be limited not by this detailed description, but rather by any claims that issue on an application based hereon. Accordingly, the disclosure of the examples is intended to be illustrative, but not limiting, of the scope of the subject matter, which is set forth in the following claims.

Specific details were given in the preceding description to provide a thorough understanding of various implementations of servers and components for a contextual connection server. It will be understood by one of ordinary skill in the art, however, that the implementations described above may be practiced without these specific details. For example, circuits, servers, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

It is also noted that individual implementations may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

Client devices, network devices, and other devices can be computing servers that include one or more integrated circuits, input devices, output devices, data storage devices, and/or network interfaces, among other things. The integrated circuits can include, for example, one or more processors, volatile memory, and/or non-volatile memory, among other things. The input devices can include, for example, a keyboard, a mouse, a key pad, a touch interface, a microphone, a camera, and/or other types of input devices. The output devices can include, for example, a display screen, a speaker, a haptic feedback server, a printer, and/or other types of output devices. A data storage device, such as a hard drive or flash memory, can enable the computing device to temporarily or permanently store data. A network interface, such as a wireless or wired interface, can enable the computing device to communicate with a network.

Examples of computing devices include desktop computers, laptop computers, server computers, hand-held computers, tablets, smart phones, personal digital assistants, digital home assistants, as well as machines and apparatuses in which a computing device has been incorporated.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

The various examples discussed above may further be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable storage medium (e.g., a medium for storing program code or code segments). A processor(s), implemented in an integrated circuit, may perform the necessary tasks.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the implementations disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall server. Skilled artisans may implement the described functionality in varying ways for each particular application, but such implementation decisions should not be interpreted as causing a departure from the scope of the present disclosure.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for implementing a suspended database update server.

The foregoing detailed description of the technology has been presented for purposes of illustration and description. It is not intended to be exhaustive or to limit the technology to the precise form disclosed. Many modifications and variations are possible in light of the above teaching. The described embodiments were chosen in order to best explain the principles of the technology, its practical application, and to enable others skilled in the art to utilize the technology in various embodiments and with various modifications as are suited to the particular use contemplated. It is intended that the scope of the technology be defined by the claim.

Thus, particular embodiments of the invention have been described. Other embodiments are within the scope of the following claims. For example, the actions recited in the claims can be performed in a different order and still achieve desirable results.

What is claimed is:

1. A method comprising:
receiving a data set for processing;
determining a time limit for the data set, wherein the time limit is associated with an amount of time that data in the data set remains as valid data;
determining a size of the data set;
determining a set of software bots, wherein a size of the set of software bots is determined based on the time limit and the size of the data set;
splitting the data set into a plurality of data subsets;
generating a set of directories associated with a plurality of network clients, wherein the plurality of network clients are configured to execute the set of software bots to process the plurality of data subsets;
associating the plurality of data subsets to the set of directories, wherein associating the plurality of data subsets includes receiving user input to trigger a network client to obtain access to a corresponding data subset within the time limit;
executing the set of software bots on the plurality of network clients to simultaneously process the plurality of data subsets within the time limit;
configuring the plurality of network clients to provide an update on a processing status for the plurality of data subsets;
performing a correction process to fix a processing error associated with a data subset, wherein the correction process includes updating code of a corresponding software bot; and
generating a set of-summary reports, wherein a summary report of the set indicates a summary of the data subset associated with a corresponding directory and the correction process.

2. The method of claim 1, wherein the splitting is based on a size of the data set and a maximum size of a data subset of the plurality of data subsets.

3. The method of claim 1, further comprising:
determining a number of the plurality of network clients for processing the plurality of data subsets.

4. The method of claim 1, wherein a number of the plurality of network clients is determined based on a size of the data set, the time limit and an average processing time for available network clients.

5. The method of claim 1, wherein the update is a notification from one of the plurality of network clients indicative of a processing error for one of the plurality of data subsets.

6. A controller comprising:
one or more memories configured to store computer-readable instructions; and
one or more processors configured to execute the computer-readable instructions to:
receive a data set for processing;
determine a time limit for the data set, wherein the time limit is associated with an amount of time that data in the data set remains as valid data;
determine a size of the data set;
determine a set of software bots, wherein a size of the set of software bots is determined based on the time limit and the size of the data set;
split the data set into a plurality of data subsets;
generate a set of directories associated with a plurality of network clients, wherein the plurality of network clients are configured to execute the set of software bots to process the plurality of data subsets;
associate the plurality of data subsets to the set of directories, wherein associating the plurality of data subsets includes receiving user input to trigger a network client to obtain access to a corresponding data subset of the plurality of data subsets within the time limit;
execute the set of software bots on the plurality of network clients to simultaneously process the plurality of data subsets within the time limit;
configure the plurality of network clients to provide an update on a processing status for the plurality of data subsets;
perform a correction process to fix a processing error associated with a data subset, wherein the correction process includes updating code of a corresponding software bot; and
generate a set of-summary reports, wherein a summary report of the set indicates a summary of the data subset associated with a corresponding directory and the correction process.

7. The controller of claim 6, wherein the one or more processors are configured to execute the computer-readable instructions to split the data set based on a size of the data set and a maximum size of a data subset of the plurality of data subsets.

8. The controller of claim 6, wherein the one or more processors are further configured to execute the computer-readable instructions to determine a number of the plurality of network clients for processing the plurality of data subsets.

9. The controller of claim 6, wherein a number of the plurality of network clients is determined based on a size of the data set, the time limit and an average processing time for available network clients.

10. The controller of claim 6, wherein the update is a notification from one of the plurality of network clients indicative of a processing error for one of the plurality of data subsets.

11. One or more non-transitory computer-readable media comprising computer-readable instructions, which when executed by one or more processors of a controller, cause the controller to:

receive a data set for processing;

determine a time limit for the data set, wherein the time limit is associated with an amount of time that data in the data set remains as valid data;

determine a size of the data set;

determine a set of software bots, wherein a size of the set of software bots is determined based on the time limit and the size of the data set;

split the data set into a plurality of data subsets;

generate a set of directories associated with a plurality of network clients, wherein the plurality of network clients are configured to execute the set of software bots to process the plurality of data subsets;

associate the plurality of data subsets to the set of directories, wherein associating the plurality of data subsets includes receiving user input to trigger a network client to obtain access to a corresponding data subset within the time limit;

execute the set of software bots on the plurality of network clients to simultaneously process the plurality of data subsets within the time limit;

configure the plurality of network clients to provide an update on a processing status for the plurality of data subsets;

perform a correction process to fix a processing error associated with a data subset, wherein the correction process includes updating code of a corresponding software bot; and generate a set of-summary reports, wherein a summary report of the set indicates a summary of the data subset associated with a corresponding directory and the correction process.

12. The one or more non-transitory computer-readable media of claim 11, wherein the execution of the computer-readable instructions by the one or more processors cause the controller to split the data set based on a size of the data set and a maximum size of a data subset of the plurality of data subsets.

13. The one or more non-transitory computer-readable media of claim 11, wherein the execution of the computer-readable instructions by the one or more processors cause the controller to determine a number of the plurality of network clients for processing the plurality of data subsets.

14. The one or more non-transitory computer-readable media of claim 11, wherein a number of the plurality of network clients is determined based on a size of the data set, the time limit and an average processing time for available network clients.

15. The one or more non-transitory computer-readable media of claim 11, wherein the update is a notification from one of the plurality of network clients indicative of a processing error for one of the one or more plurality of data subsets.

* * * * *